INFORMATION CONVERTER EMPLOYING A MAGNETIC DOMAIN WALL MEDIUM

Filed June 15, 1966 5 Sheets-Sheet 1

INVENTORS R. A. KAENEL
J. L. SMITH
BY Herbert M Shapiro
ATTORNEY

INFORMATION CONVERTER EMPLOYING A MAGNETIC DOMAIN WALL MEDIUM

United States Patent Office 3,466,628
Patented Sept. 9, 1969

3,466,628

INFORMATION CONVERTER EMPLOYING A MAGNETIC DOMAIN WALL MEDIUM

Reginald A. Kaenel, Chatham, and James L. Smith, Bedminster, N.J., assignors to Bell Telephone Laboratories, Incorporated, Murray Hill, N.J., a corporation of New York

Filed June 15, 1966, Ser. No. 557,810
Int. Cl. G11b *5/00*
U.S. Cl. 340—174 11 Claims

ABSTRACT OF THE DISCLOSURE

A magnetic domain wall medium is adapted for use as a multifrequency-to-dial-pulse converter by an input configuration which translates each of a set of coded input signals representative of decimal digits into reverse domains of correspondingly different lengths.

This invention relates to information processing circuits and, more particularly, to such circuits which convert information from one form to another.

Information converters are used, for example, to convert multifrequency input information to dial pulses thus making pushbutton type telephones compatible with existing central offices. The function of such a converter, in this context, includes the reception of a multifrequency code, the translation of the multifrequency code to a two-out-of-seven (or other *m*-out-of-*n*) code, and the conversion of the latter code into a corresponding number of dial pulses for each multifrequency pulsed digit.

Copending application Ser. No. 531,885 of J. L. Smith, filed March 4, 1966, discloses a multifrequency to dial pulse converter comprising a magnetic domain wall device wherein a buffer store is defined by overlapping and by operating in a mutually exclusive manner two independent means for propagating reverse magnetized domains through the magnetic medium of that device. The present invention provides an improvement in that converter and is described herein in the context of that converter. It will become clear that the invention has broader implications.

For reference, a domain wall device comprises a magnetically initialized propagation medium, typically a wire, in which stable reverse magnetized domains are provided in response to a first field in excess of a nucleation threshold and through which reverse domains are propagated in response to a second field less than the nucleation threshold and in excess for a propagation threshold. Typically, reverse domains are provided in a limited input portion of the wire during a write operation and are propagated to a remote output portion by step-along second fields applied during a propagation operation. One such device is described in K. D. Broadbent, Patent No. 2,919,432, issued Dec. 29, 1959. Inasmuch as a stable reverse domain, once established, need not be sustained by magnetic fields in the propagation medium and can be positioned and its movement stopped without dissipation thereof, such a domain may be characterized as nonvolatile.

An object of this invention is to provide a new and novel information converter.

The invention is based on the realization that coded input information characters may be represented as reverse magnetized domains of corresponding coded lengths which can be propagated from position to position along a domain wall wire and that leading and trailing domain walls of such domains may be used to position the corresponding domains with respect to an output position in the wire and means initializing that output position each time the domain is advanced. The length of an interrogated domain determines the number of times flux "switches" in the output position in response to consecutive initializations. In this manner, a number of output (dial) pulses corresponding to the length of the interrogated domain is provided. Inasmuch as leading and trailing domain walls bound a domain, the leading and trailing domain walls of an interrogated domain, respectively, may be thought of as enabling and inhibiting output pulses corresponding to that domain.

Accordingly, the foregoing and further objects of this invention are realized in one embodiment thereof wherein a plurality of input conductors coupled to coded positions along a write portion of a domain wall wire provide a reverse magnetized domain of corresponding length when pulsed in coded pairs. A first set of propagation conductors couples the write portion and a buffer portion of the wire. A second set of propagation conductors couples the buffer portion and a read portion of the wire. An information character, then, is stored as a domain of coded length in the write portion of the wire and advanced to the buffer portion in response to each coded input signal. Information is advanced to the read portion of the wire in response to a read signal where the leading edge of the reverse domain enables a series of pulses and the trailing edge inhibits the pulses as described before. A number of dial pulses corresponding to the information indicating length of the reverse domain is provided with relatively little external logic circuitry.

A feature of this invention is an information converter including means responsive to coded input signals for providing nonvolatile discontinuities of corresponding coded lengths in a propagation medium and means controllably moving such discontinuities through the medium.

Another feature of this invention is an information converter including means responsive to coded input signals for providing reverse domains of corresponding coded lengths in a domain wall medium.

Another feature of this invention is an information converter including means responsive to the advance of reverse domains of information indicative length through an output position in a domain wall medium for controlling corresponding numbers of dial pulses.

The invention and the various objects and features thereof will be understood more fully from a consideration of the following detailed description thereof rendered in conjunction with the accompanying drawing, wherein.

Figure 1:
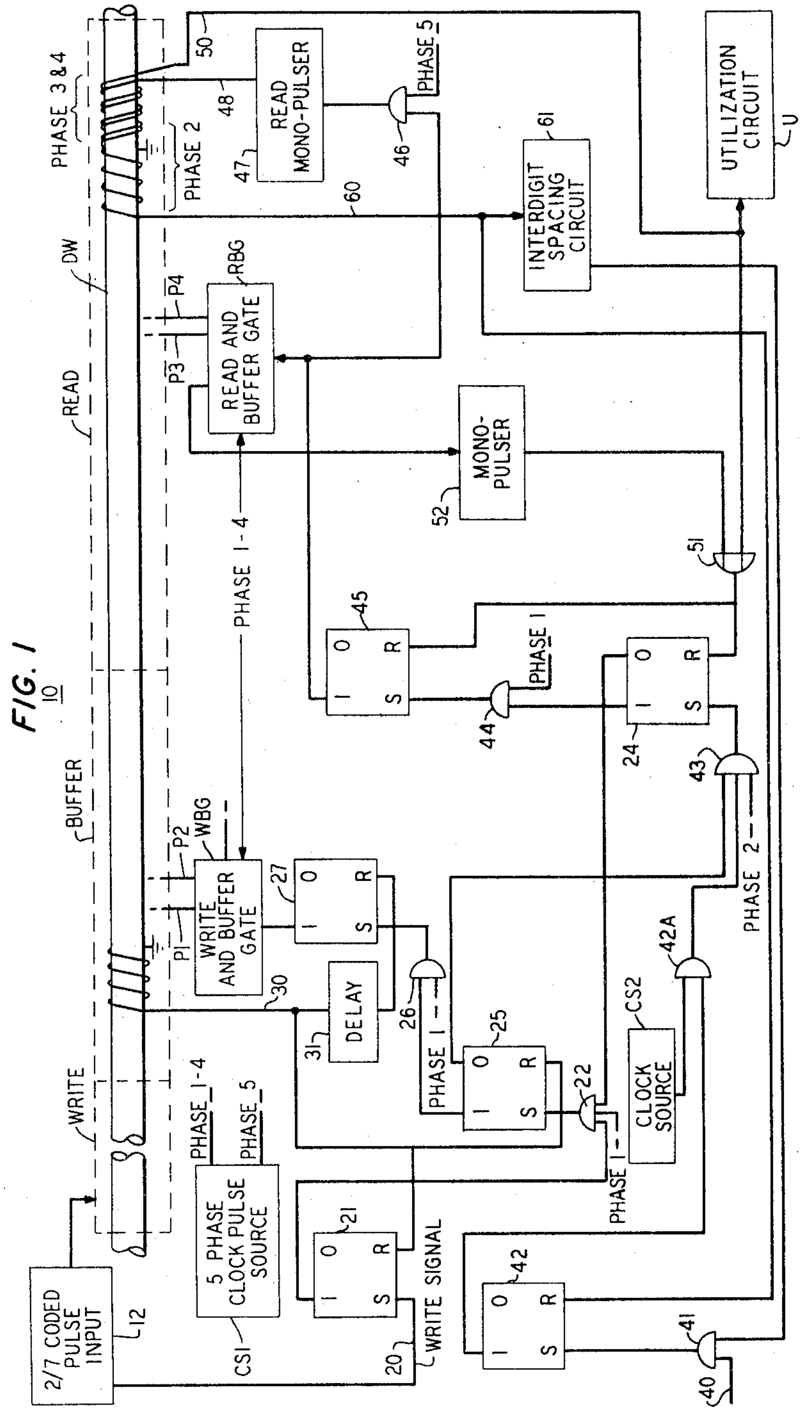
FIG. 1 is a schematic illustration of a converter in accordance with this invention.

FIG. 1 shows a converter 10 in accordance with this invention. The converter includes a domain wall wire DW which may be thought of as divided, from an operational standpoint, into write, buffer, and read portions. This imaginary division of wire DW is indicated in FIG. 1 by the broken blocks designated write, buffer, and read. Such a division of wire DW and the operation thereof are entirely consistent with the teaching of the aforementioned copending application which is specifically incorporated hereby by reference.

Information is written into domain wall wire DW as reverse magnetized domains of coded length. It is important that the representation of coded information as reverse domains of coded length and the movement of those domains through the domain wall wire be fully understood for a complete understanding of the converter of FIG. 1.

Figure 2:
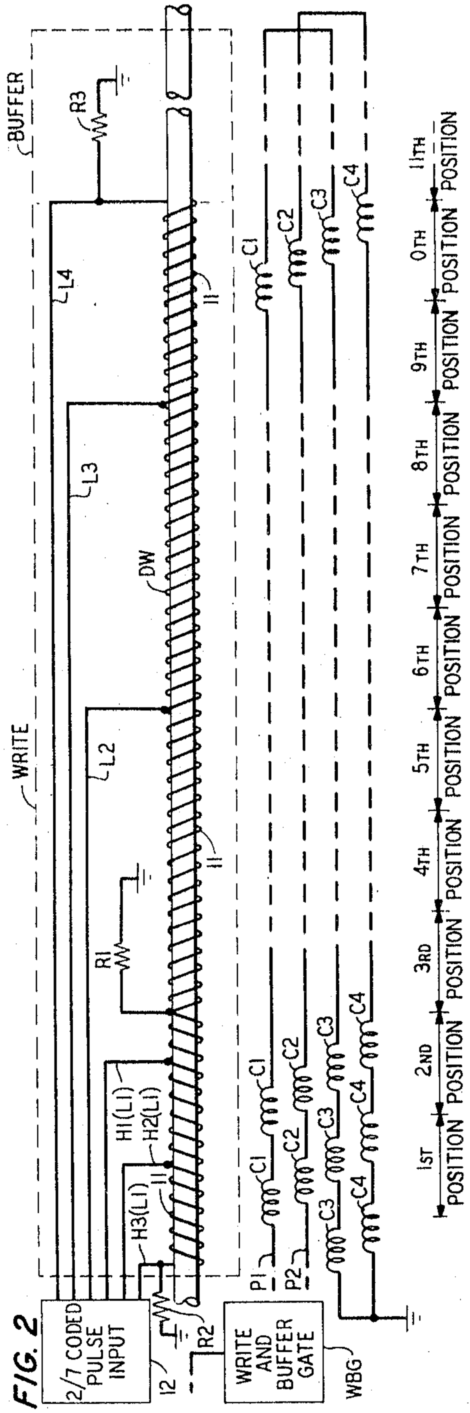
FIGS. 2 and 5 through 10 are schematic illustrations of portions of the converter of FIG. 1 showing flux patterns therein.

FIG. 2 shows the write portion of FIG. 1 in detail. Seven input conductors L1, L2, L3, L4, H1, H2, and H3 are seen to couple domain wall wire DW at different positions therealong. The disposition of those conductors is described conveniently with respect to the propagation means which, accordingly, is described in detail first. Specifically, a position along a domain wall wire is defined by four adjacent coils of two interleaved propagation conductors P1 and P2 shown in FIG. 2. Each of those conductors includes two portions in each of which the coils couple wire DW in like sense. The coils of the two portions of each conductor couple wire DW in opposite senses however. For example, coils C1 and C3 are in first and second portions of conductor P1 and couple wire DW in opposite senses as shown in FIG. 2. Similarly, coils C2 and C4 are in first and second portions of conductor P2 and couple wire DW in opposite senses. All the coils C1 and C2, however, are coupled to wire DW in a first sense; all the coils C3 and C4 couple wire DW in a second sense. Although the coils are shown spaced apart from wire DW in FIG. 2 they are to be understood to couple that wire in an interleaved fashion. Thus each set of coils C1, C2, C3, and C4 couple wire DW in succession and define a bit position therealong. A bit position is indicated in FIG. 2 by the double-headed arrow corresponding to each set of coils.

Figure 3:
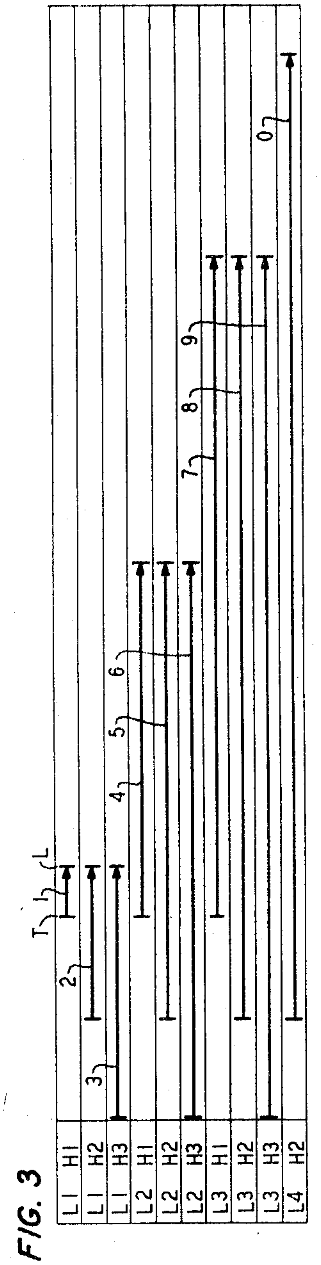
FIG. 3 is a chart showing flux patterns in the portion of the converter shown in FIG. 2 during operation.

A sequence of propagation pulses +P1, +P2, −P1, and −P2, where the plus and minus signs indicate the polarity of the applied pulses, are applied to conductors P1 and P2 to advance reverse domains through the domain wall wire DW. The advance of a reverse domain one position, then, requires four phases of the illustrative propagation pulse sequence. Each domain is bounded by leading and trailing domain walls L and T, respectively, as shown in FIG. 3. If domains are written into the wire DW such that the leading domain wall corresponds to a first propagation phase position and the trailing domain wall corresponds to a third phase position, the initial separation between the leading and trailing walls of a reverse domain is maintained constant during a propagation operation herein.

Figure 4:
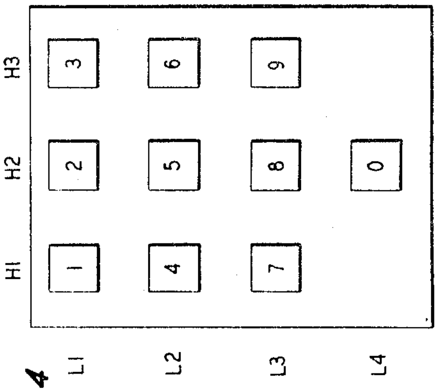
FIG. 4 is a schematic view of a pushbutton dial.

The input conductors are arranged, illustratively, to provide reverse domains having leading and trailing domain walls corresponding to first and third propagation phases, respectively, in response to the depression of digit-select buttons on, say, a pushbutton subset. FIG. 4 shows a schematic view of a pushbutton dial. The buttons are arranged in rows of three including the buttons 1–3, 4–6, and 7–9. Those rows are designated L1, L2, and L3. An additional row L4 includes the zero button. The columns are designated H1, H2, and H3, the zero button being positioned in the second column. Thus the designations for the input conductors correspond to the coordinates for the buttons of the pushbutton dial. The depression of a digit-select button, then, causes the pulsing of a coded pair of H and L conductors and the nucleation of a reverse domain of corresponding length and having leading and trailing domain walls in the first and third phase positions.

FIGS. 2 and 3 show the reverse domains corresponding to each digit-select button and the initial positions for those domains in wire DW. For simplicity, we will refer to positions along wire DW as corresponding to positions of the propagation coils. The leading domain wall is initially at a first phase position which corresponds to the left edge (as viewed) of a coil C1. The trailing edge is initially, at a third phase position which corresponds to the left edge of a coil C3. A reverse domain representing the digit one, then, initially occupies a position in wire DW corresponding to the third and fourth phase coils C3 and C4 of the second bit position as shown in FIG. 3. When the 1 digit-select button is depressed, the input conductor H1(L1) is pulsed. This is clear from FIG. 4. FIG. 3 shows the reverse domain, designated 1, and the correspondence to the H1(L1) input conductor.

Let us examine how the input conductors are coupled to wire DW to provide such coded domains. We will assume that wire DW is initialized to a magnetization represented by an arrow directed to the left as viewed in FIG. 2. A reverse domain then is represented by an arrow directed to the right. The boundaries between a reverse domain and the adjacent initialized portions of wire DW constitute the leading and trailing domain walls represented by the vertical lines designated L and T in FIG. 3. FIG. 2 shows a coil 11 coupled to wire DW along ten and one-half bit positions. A resistance R1 is connected between coil 11, to the left of coil C1 of the third position, and ground. Input conductor H1(L1) is connected to coil 11 to the left of coil C3 of the second position. Coil 11 is connected to ground at its ends through resistors R2 and R3. Note that coil 11 extends, at one end, to the left of the coil C3 of the first position and that the coil 11 is coupled to wire DW in a first sense between resistors R1 and R2 and in a second (opposite) sense between resistors R1 and R3. A pulse of a first polarity in conductor H1(L1) [note conductors H1 and L1 are the same conductor illustratively] causes current to flow through coil 11 to ground through the resistances R1, R2, and R3. The flow of current in coil 11 between the coil C3 of the second position and the coil C1 of the third position is in a direction and of an amplitude to nucleate a reverse domain 1 shown in FIG. 3 and in a direction to initialize the remainder of wire DW. The relative values of resistances R1, R2, and R3 are chosen to foster a balance in the current distribution through wire DW and are chosen, for example, such that R1 is about a half the value of R2 or R3 and all these resistances are much larger than the resistance of the coil 11. Importantly, in wire DW to the right and to the left of the 1 domain, current flows in coil 11 in a direction to drive magnetization in the initialized direction and thus may be ignored.

Input conductor H2(L1) is connected to coil 11 to the left of the coil C3 of the first position. Thus current flowing in that conductor through coil 11 and resistor R1 to ground nucleates a domain 2 shown in FIG. 3. Conductor H2(L1) is activated when the digit-select button number 2 is depressed. The H3(L1) input conductor is connected to coil 11 to the left of coil C3 in the position to the left of the first bit position. The depression of pushbutton 3 activates conductor H3(L1) and provides a reverse domain 3 shown in FIG. 3. It is clear from FIGS. 2 and 3 that in each instance when a reverse domain is provided the remainder of the write portion of wire DW is initialized. It is clear that the L1 conductor is unnecessary in the illustrative arrangement. That conductor is shown only for preserving the correspondence between the pushbutton dial in a manner consistent with the aforementioned copending application.

The L2, L3, and L4 conductors are connected to coil 11 to the left of coil C1 of the sixth, ninth and eleventh positions, respectively. Depression of the corresponding digit-select button causes a pulse of a first polarity to flow through the selected L conductor as well as through the coordinate H conductor. The sense of coil 11 between a selected L conductor and resistance R1 is opposite to the sense of coil 11 between an H conductor and resistance R1. Consequently, a field of a first polarity is generated in wire DW by the current flowing in coil 11 between an H conductor and ground and a field also of a first polarity is generated in wire DW by the current flowing in coil 11 between an L conductor and ground, both generating currents flowing primarily through resistance R1 to ground. For example, the depression of pushbutton 5 of FIG. 4 activates conductors L2 and H2. A field of a first polarity is generated by the current flowing in coil 11 from the coil C3 of the first position to the coil C1 of the third position to ground through resistance R1. This field alone provides domain 2 as shown in FIGURE 3. In addition, however, a field of a first polarity is generated by the current flowing in coil 11 from the first phase of the sixth position to the first phase of the third position through resistance R1 to ground. The domain 5 (FIG. 3) results instead. The remaining reverse domains are shown and designated in FIG. 3 along with the correspondence (to the left as viewed) with the coordinates of the selecting pushbuttons. The bounding domain walls of each reverse domain are shown also corresponding to the connections between coil 11 and the coded input conductors and/or the connection between coil 11 and resistor R1.

Each pulse of the aforementioned propagation pulse sequence is operative on any reverse domains having leading domain walls at a first phase position and trailing domain walls at a third phase position to advance those walls to the right (as viewed) one position concurrently. We have now shown the form of information stored on a domain wall wire in accordance with this invention and the propagation of that information through the wire and are, accordingly, in a position to consider the converter of FIG. 1.

The input conductors H1 . . . H3 and L1 . . . L4 are connected in FIGS. 1 and 2 to a block 12 designated 2/7 (two-out-of-seven) coded pulse source which may be the output of a multifrequency to 2/7 converter in a telephone central office. Propagation conductors P1 and P2 are shown in FIG. 2 connected to a write and buffer gate WBG which is also shown in FIG. 1. Those propagation conductors couple wire DW along the write and buffer portions. Similar propagtion conductors P3 and P4, shown in FIG. 1, are connected between a read and buffer gate RBG and couple wire DW over the buffer and read portions. The gates WBG and RBG operate to gate four-phase pulses from a (five-phase) clock source CS1 for applying conventional four-phase propagation pulse sequences over different portions of wire as is described hereinbefore leaving one phase, the fifth phase, for use as described hereinafter. The propagation conductors P1 and P2 and P3 and P4 are only indicated in FIG. 1 but are to be understood as coupling wire DW as shown in FIG. 2 (and 10) along different portions thereof.

When a digit-select button on a pushbutton subset is depressed, a "write" signal is applied to conductor 20 shown in FIG. 1. Conductor 20 is connected to the set input of a flip-flop 21. The set output of flip-flop 21 is connected to an input of an AND circuit 22. Second and third inputs of AND circuit 22 are connected to five-phase clock pulse source CS1 and the reset output of a flip-flop 24. The output of AND circuit 22 is connected to the set input of a flip-flop 25. The set output of flip-flop 25, in turn, is connected to an input of an AND circuit 26. A second input of AND circuit 26 is connected to clock source CS1 also. The output of AND circuit 26 is connected to the set input of a flip-flop 27. The set output of flip-flop 27 is connected to write and buffer gate WBG.

For the moment let us assume that flip-flop 24 is in a reset condition. When five-phase clock pulse source is in its first phase, AND circuit 22 is enabled. AND circuit 26 also is enabled at that time. Consider the operation when the subscriber depresses a digit-select button. First a domain of corresponding coded length is provided as described, via the input conductors, in the write portion of wire DW, and flip-flop 21 is set. When clock source CS1 is next in its first phase, flip-flop 25 is set, flip-flop 27 is set, and the write and buffer gate WBG is enabled thus gating four-phase pulse sequences from clock pulse source CS1 to propagation conductors P1 and P2 for advancing the coded reverse domain into the buffer portion of wire DW.

The coded domain advances to the right as viewed until the trailing domain wall passes a prescribed position. The prescribed position is spaced apart from the write portion any arbitrary distance sufficient to permit the trailing domain wall to clear the write portion of wire DW and, illustratively, is positioned at the coil C2 of the eleventh position (from the left) along wire DW. That position is coupled by a conductor 30 which is connected between ground and the reset inputs of flip-flops 21, 25, and 27. The connection to flip-flop 27 is via a one-phase delay 31 which insures completion of a four-phase propagation cycle. Thus when a coded reverse domain is written into the write portion of wire DW, it is moved into the buffer position until the trailing domain wall passes the position along wire DW coupled by conductor 30. The leading domain wall is ignored; the trailing domain wall induces a pulse in conductor 30 resetting flip-flop 27 after a one-phase delay. Typically, a leading domain wall provides a positive pulse and the trailing wall a negative pulse when passing a conductor such as 30. The leading domain wall is ignored conveniently by coupling conductor 30 to wire DW such that the trailing wall provides the positive pulse. The operation repeats for the depression of each digit-select button until the entire called number is stored.

We have assumed that flip-flop 24 is in a reset condition. Flip-flop 24, however, is the read flip-flop and may not be in a reset condition. Read signals are received from a telephone central office and indicate the readiness of the central office to accept dial pulses. Those read (or digit-accept) signals are received on a conductor 40 connected to an input of an AND circuit 41 as shown in FIG. 1. We will assume that AND circuit 41 is enabled for the moment. The output of AND circuit 41 is connected to the set input of a flip-flop 42. The set output of flip-flop 42, in turn, is connected to an input of an AND circuit 42A. A clock pulse source CS2 is connected to another input of AND circuit 42A. The output of AND circuit 42A is connected to an input of an AND circuit 43. Second and third inputs of AND circuit 43 are connected to the reset output of flip-flop 25 and to five-phase clock pulse source CS1. The output of AND circuit 43 is connected to the set input of flip-flop 24. The set output of flip-flop 24 is connected to an input of an AND circuit 44. A second input of AND circuit 44 is also connected to clock pulse source CS1. The output of AND circuit 44 is connected to the set input of a flip-flop 45. The set output of flip-flop 45, in turn, is connected to read and buffer gate RBG and to an input of an AND circuit 46. Another input of AND circuit 46 is connected to clock source CS1. The output of AND circuit 46 is connected to a read monopulser 47 which in turn is connected to a conductor 48 coupled to a portion of an output position in wire DW also coupled by propagation coils C3 and C4.

If a digit-accept signal is received, flip-flop 42 is set. When flip-flop 25 is next reset at the arrival of information at the position coupled by conductor 30, and thereafter when clock source CS1 provides a next phase two, AND circuit 43 is enabled and flip-flop 24 is set. When clock source CS1 next provides a phase one pulse, AND circuit 44 sets flip-flop 45 which in turn activates read and buffer gate RBG for gating four-phase clock pulses from clock source CS1 to propagation conductors P3 and P4. At the time flip-flop 45 is set, AND circuit 46 also is enabled and every fifth clock pulse from clock source CS1 thereafter triggers monopulser 47 for pulsing conductor 48 to drive the coupled portion of the output position to an initialized condition.

A conductor 50, coupled to the portion of the output position also coupled by conductor 48, is connected between an input to an OR circuit 51 and a utilization circuit U at one end and ground at the other. The read and buffer gate RBG also is connected to an input of OR circuit 51 via a monopulser 52. The output of OR circuit 51 is connected to the reset inputs of flip-flops 24 and 45.

A conductor 60, coupled to the portion of the output position also coupled by coil C2, is connected between an interdigit spacing circuit 61 and ground. Conductor 60 also is connected to the reset input of flip-flop 42. Interdigit spacing circuit 61 is connected to an input of AND circuit 41.

Consider the operation when the central office signals (at 40) its readiness to accept a digit. Dial information is present as coded reverse domains in the buffer portion of wire DW. Assume that clock source CS2 provides ten pulses per second. AND circuit 42A, then, is activated ten times per second. AND circuit 43, in turn, is activated on the next phase two if flip-flop 25 is in the reset condition. Flip-flop 24, then, is set and AND circuit 44 is activated on the next phase one setting flip-flop 45. Flip-flop 45 activates read and buffer gate RBG for applying four-phase propagation pulses to conductors P3 and P4 coupled to the buffer and read portions of wire DW. Note that the flip-flops 25 and 24 are always in opposite conditions operating the write-buffer and the buffer-read propagation means in a mutually exclusive manner. Flip-flop 45 also enables AND circuit 46 at this time.

Stored reverse domains now are being propagated from the buffer to the read portion of the wire DW. When the leading domain wall of a stored reverse domain reaches the portion of the output position coupled by conductor 60 it induces a positive pulse therein. Interdigit spacing circuit 61 and flip-flop 42 ignore such a pulse. Positive pulses may be ignored conveniently by including an inverter (not shown) in conductor 60 or in a manner described in connection with conductor 30 hereinbefore.

As the leading domain wall passes the portion of the output position coupled by conductors 48 and 50, it induces a pulse in conductor 50 which is also ignored. On the following phase five, however, read monopulser 47 is activated for driving the portion of the coded domain coupled by conductor 48 to an initialized direction. The resulting reversal of flux induces a voltage in conductor 50 for detection by the utilization circuit U which conveniently includes an implementation to discriminate against pulses except at phase five. That voltage in conductor 50 also activates OR gate 51 resetting flip-flops 24 and 45 enabling a further write operation and terminating the advance of reverse domains in the read portion of wire DW.

On the following phase one, AND circuit 22 is enabled and a write operation is permitted. In the absence of such a write operation (additional dial information), clock CS1 enables AND circuit 43 for activation on the next phase two. In this manner the advance of reverse domains in the buffer and read portions of wire DW is again initiated. On the next phase five another voltage pulse is provided on conductor 50 terminating the advance of reverse domains.

Operation continues as described until the trailing domain wall of the interrogated reverse domain arrives at the portion of the output position coupled by conductor 60 inducing a negative pulse therein. That negative pulse activates interdigit spacing circuit 61. Interdigit spacing circuit 61 is, conveniently, a monopulser which normally provides a voltage level for enabling AND circuit 41. When circuit 61 is activated, however, it provides a null disabling AND circuit 41 for a preset time. The pulse on conductor 60 at this time also resets flip-flop 42. Only at the termination of the preset null from interdigit spacing circuit 61 may a digit-accept signal set flip-flop 42 for an additional read operation. In this manner, pulses are provided on conductor 50 at a maximum rate determined by clock CS2. The number of pulses provided between interdigit spacings is determined by the number of bit positions occupied by the interrogated reverse domain. Since the lengths of reverse domains in accordance with this invention are coded to correspond to coded decimal digits as explained in connection with FIGS. 2 and 3, the correspondence between digit input information and numbers of pulses on conductor 50 is clear. Those pulses on conductor 50 are dial pulses and the utilization circuit U, accordingly, may be switching apparatus in a telephone central office.

The mutually exclusive operation of the write-buffer and buffer-read propagation means to provide the illustrative asynchronous operation is entirely consistent with the teaching of the aforementioned Smith application. Such operation imposes only negligible restraints on the permissible times for a write-in operation. A subscriber may go off-hook at any time. If a read operation is in progress, flip-flop 21 is still set as the coded domain is written into the write portion of wire DW. When the read operation terminates, AND circuit 22 is enabled and information is moved to the buffer region. Each read operation requires at most only the time necessary for applying eleven times sixteen four-phase propagation sequences (actually five phases) for a converter handling a maximum of sixteen digits. Propagation pulses are conveniently applied at a fifty kilocycle rate leading to a negligible write operation delay of only one hundredth of a second.

The various logic circuits, drivers, clocks et cetera may be any such elements capable of operating in accordance with this invention.

For purposes of the following illustrative operation the various gates and flip-flops are assumed to have no delay.

Figures 5, 6, 7, 8, 9:
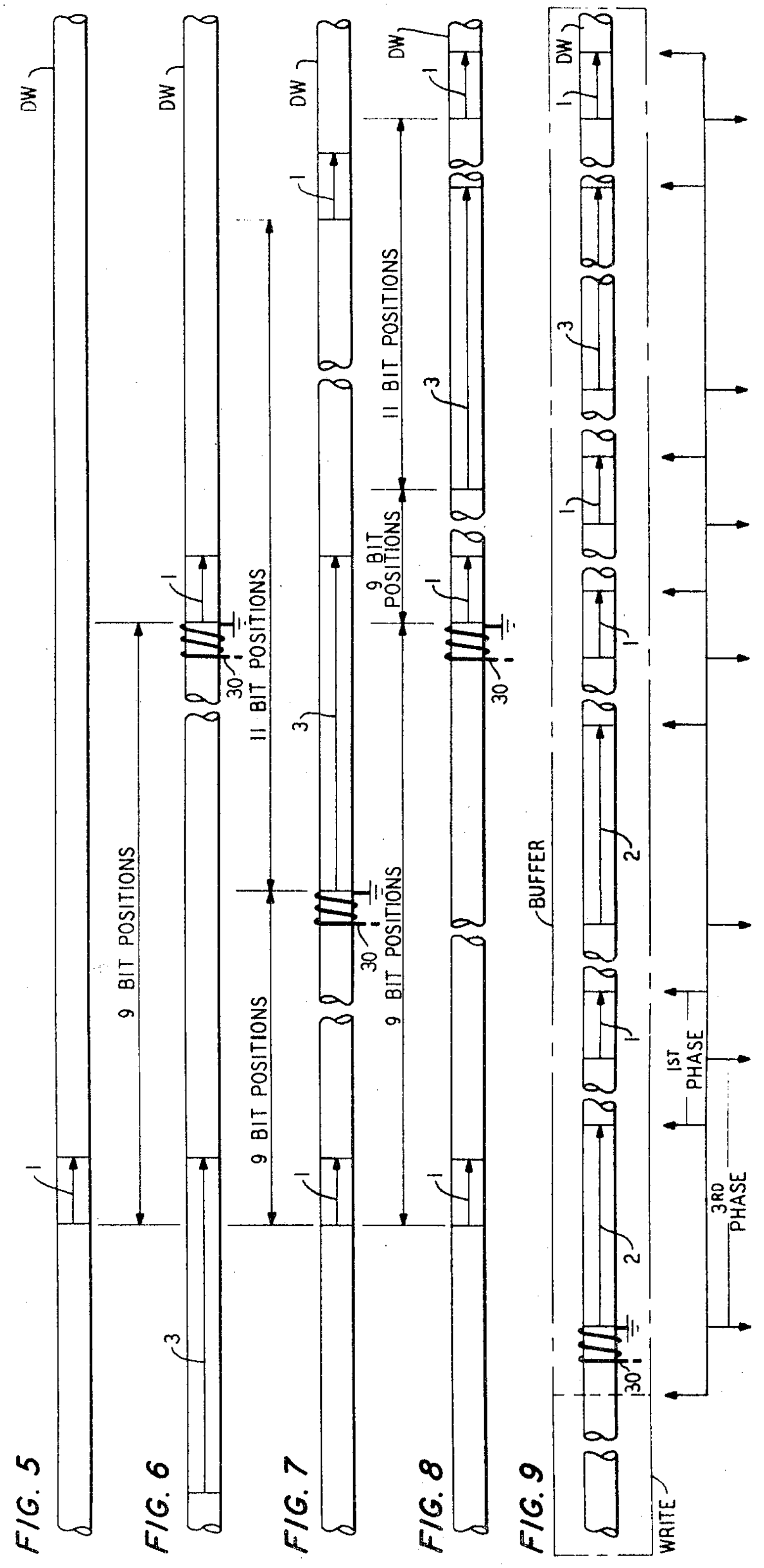

Consider an illustrative number 1311212 written into wire DW by the consecutive depression of the corresponding buttons of a pushbutton subset as shown in FIG. 4. And assume that we do not have a digit-accept signal from the central office. First a one domain is stored as shown in FIG. 3. FIG. 5 also shows that domain. The domain is moved immediately as described to the position coupled by conductor 30. This is shown in FIG. 6. FIG. 6 also shows the reverse domain representing the next digit three. The trailing wall of the last-mentioned domain is eleven bit positions from the trailing wall of the domain representing the first digit. The spacing between adjacent domains is preserved during propagation of those domains in accordance with this invention.

Upon writing of the "three" domain, both domains are advanced eleven positions until the trailing wall of the three domain passes conductor 30. This is shown in FIG. 7. The next digit is now written in also as shown in FIG. 7. Again all the stored domains are advanced only nine positions this time until the trailing wall of the last stored digit representation passes conductor 30. This is shown in FIG. 8. The position of the next stored digit one is also shown in FIG. 8.

FIG. 9 shows the disposition of the entire called number representation in the buffer portion of wire DW showing the trailing wall of the last digit representation at conductor 30. All the leading walls are still in a first phase position and all the trailing walls are in a third phase position as indicated by the arrows in FIG. 9 directed upward and downward, respectively. The buffer portion of wire DW, of course, is long enough to store the permitted maximum number of digit representations.

Figure 10:
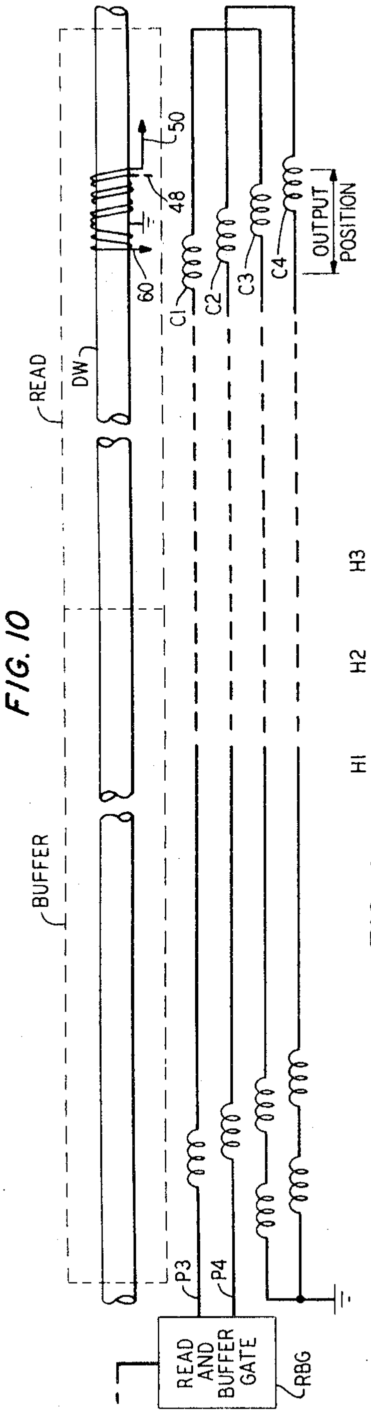

The central office now is assumed to provide a digit-accept signal triggering gate RBG as described for advancing the domains shown in the buffer portion of FIG. 9 into the read portion of wire DW. FIG. 10 shows the buffer and read portions of wire DW as well as the propagation conductors P3 and P4 coupled to those portions. The output position of wire DW is indicated as encompassing a four-phase terminal section of wire DW including the second phase portion to which conductor 60 of FIG. 1 is coupled and the phase three and four portions to which conductors 48 and 50 of FIG. 1 are coupled.

The reverse domains advance along wire DW until the leading wall of the domain representing the first digit passes the third and fourth phase portions of the output position and the trailing wall passes the second phase portion of the output portion. That leading wall thus passes conductor 50. The pulse is ignored. On the next fifth phase pulse, monopulser 47 interrogates the output position; the domain representing a decimal one is there. In response, the domain is erased providing a pulse in conductor 50. Meanwhile, in passing the second phase portion of the output position, the trailing wall triggers the interdigit spacing circuit. Importantly, during a read operation, the phases three and four portions of the output position are initialized on every fifth phase clock pulse providing the pulses for utilization circuit U. If no domain is present in the output position, of course, no flux switching occurs and no output pulse results. Operation repeats providing output pulses as described until the trailing wall of the domain being interrogated passes conductor 60. For a stored digit one representation, the trailing wall passes conductor 60 before the interrogation operation can repeat and so only one output pulse is provided.

Figure 11:
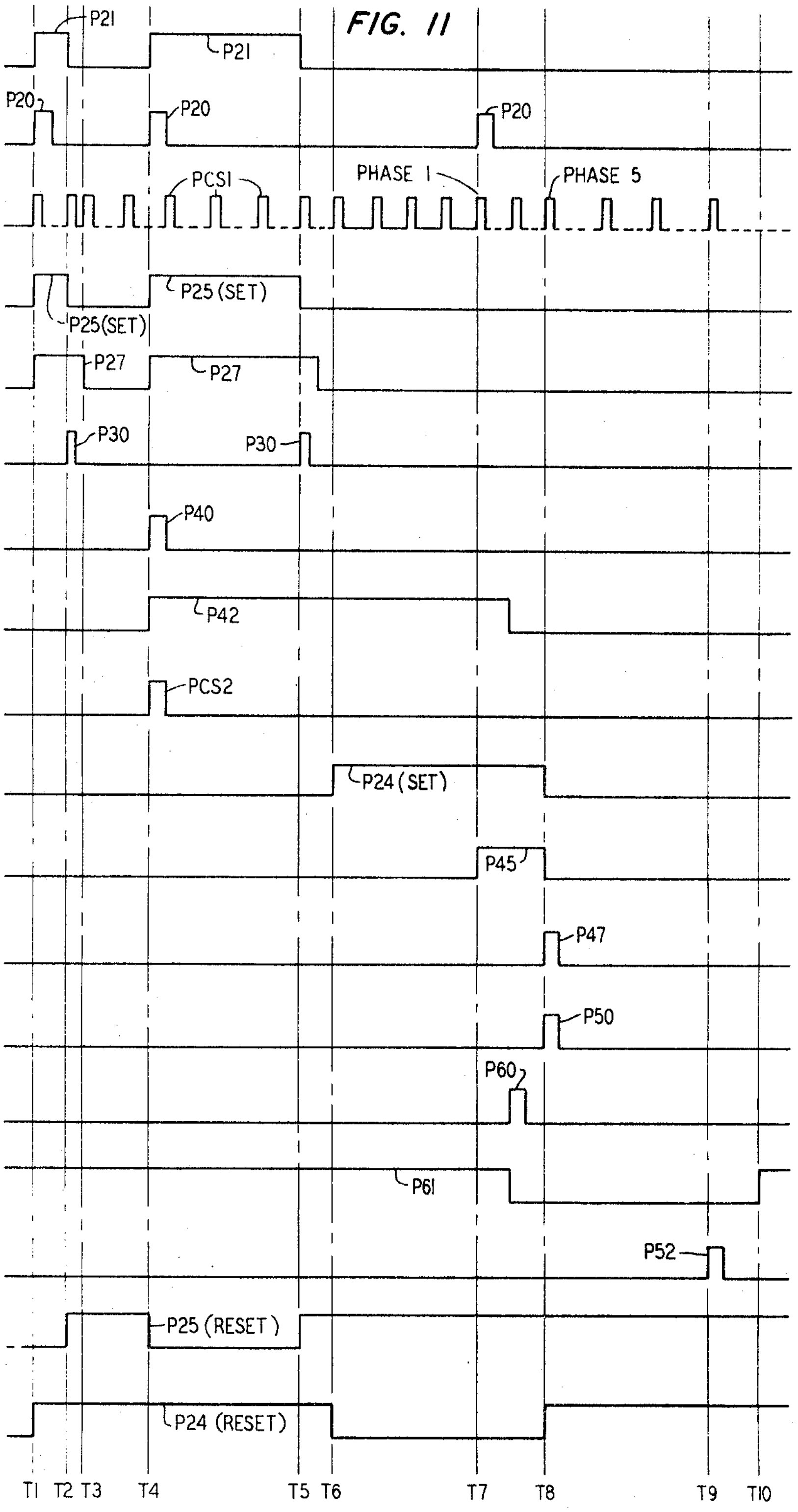
FIG. 11 is a pulse diagram of the operation of the circuit of FIG. 1.

In practice, digit-accept signals are usually received from the central office before a subscriber can dial a complete number. Thus, write and read operations usually interleave. FIG. 11 is a pulse diagram in terms of which the write and read operations as described hereinbefore are summarized. It will become clear that these operations interleave without difficulty.

Let us assume that a subscriber "dials" a first digit simultaneously providing a pulse P20 on conductor 20 at time *t1* as shown in FIG. 11. The first digit representation is stored as already described. Pulse P20 sets flip-flop 21 also at time *t1* as indicated by the pulse P21 in FIG. 11. Assume a first phase clock pulse (from source CS1) is present at time *t1*. If flip-flop 24 is in a reset condition, flip-flops 25 and 27 are set as indicated by the pulses P25 (set) and P27 in FIG. 11. The stored information advances until a pulse P30 is induced in conductor 30 at time *t2* which is on a fourth propagation phase. Pulse P30 resets flip-flops 21, 25, and 27, flip-flop 27 being set at time *t3* after a one-phase delay. Pulse P30 corresponds to a fourth phase propagation pulse even though it is physically situated at a coil C2 position. A pulse induced therein, however, corresponds to the propagation pulse moving the leading wall at the time the trailing wall passes the corresponding C2 coil. The fourth phase pulse advances the leading wall at that time.

At time *t4* in FIG. 11 a digit-accept signal P40 is assumed received from the central office, on conductor 40, concurrently with the dialing of a second digit and the accompanying write signal P20. Flip-flop 42 is set by digit-accept signal P40. This is indicated by the pulse P42 in FIG. 11. Flip-flop 21 also is set as at time *t4* by write signal P20. This is indicated by the pulse P21 in FIG. 11. Clock source CS2 is providing pulses PCS2 at a rate of ten per second for enabling AND circuit 42A. Even assuming a pulse PCS2 present at time *t4*, flip-flop 24 will not be set until the second phase after flip-flop 25 is reset and flip-flop 25 is not reset, as indicated by the pulse P25 (reset) in FIG. 11, until the leading domain wall of the most recently stored digit representation passes conductor 30 inducing another pulse P30. Thus even if write and digit-accept signals are received concurrently, the operation described for time *t1* repeats at time *t4*.

Let us assume, now, that the second digit is stored and that a next pulse P30 is induced in conductor 30 at time *t5*. Flip-flop 42 is still set. On the next phase two clock pulse at time *t6*, flip-flop 24 is set providing an output P24. On the next phase one at time *t7*, AND circuit 44 is activated and flip-flop 45 is set gating four-phase clock pulses to propagation conductors P3 and P4 (FIG. 10) for advancing the stored domains.

Information advances until a leading domain wall passes the output position shown in FIG. 10. The next fifth phase pulse (not a propagation pulse) activates AND circuit 46 triggering monopulser 47 for providing (an interrogate) pulse P47 as shown at time *t8* in FIG. 11. An output pulse P50 is thus providing resetting flip-flops 24 and 45. A pulse P60 is provided by the trailing domain wall for triggering interdigit spacing circuit 61 disabling AND circuit 41 and resetting flip-flop 42. The interdigit null is designated P61 in FIG. 11 initiated on the fourth phase next preceding time *t8*. Remember, the trailing wall for a digit one representation is physically two phases behind the leading wall. The pulse P60 also triggers monopulser 52 for providing a delayed pulse P52 resetting flip-flops 24 and 45 at time *t9* if those flip-flops are not yet reset. Monopulser 52 insures against locking the circuit to further inputs by resetting flip-flops 24 and 25 if an output pulse is not present to do so when a digit-accept signal is received.

Had a next digit been written in before time *t9*, say at time *t7* (see pulse P20), propagation of the then stored domain awaits the resetting of flip-flop 24 as already described. As has already been stated, the buffer portion is sufficiently long to store an entire maximum length telephone number assumed to be sixteen digits. The buffer position is sixteen times eleven positions for each digit times four propagation pulses per position plus a fifth phase between each set of propagation pulses. Thus, at the most, 880 clock pulses are required to move information through the buffer portion. The read portion is just as long as the buffer portion. Thus 1,760 clock pulses are required. At even a fifty kilocycle rate the maximum gap between times *t7* and *t9* is less than one one-hundredth of a second, far less than the time required by a subscriber to dial two digits. Thus a read operation imposes only negligible constraints on consecutive write operations.

The interdigit null (P61) terminates at time *t10* in FIG. 8 permitting further digit-accept commands to set flip-flop 42 when such commands appear as already described.

As has been stated hereinbefore, during a read operation monopulser 47 interrogates the third and fourth phase portions of the output position every fifth clock phase as described. An output pulse is provided in conductor 50 in response, however, only if a reverse domain is in the interrogated portion of wire DW. But a reverse domain is present only if a forward domain wall has passed that portion. A sufficient condition for outputs in accordance with this invention then is that a forward domain wall pass the interrogated portion and to this extent a forward domain is considered to enable outputs herein.

In accordance with this invention, a basically binary magnetic storage element is provided with an additional degree of freedom. Specifically, the realization that coded information may be stored as domains of corresponding coded length and controllably moved and stopped in a magnetic medium permits the simplicities provided by the illustrative circuit of FIG. 1. A domain wall wire is shown as the medium through which such domains are controllably moved. It is clear that other and different media such as films are also suitable to this end. Moreover, the mode of propagation is merely illustrative; other modes are known and suitable. In addition, other input means for providing the domains of coded length in accordance with this invention, such as the activation of separate coils of coded lengths, are also suitable in accordance with this invention.

Accordingly, it is to be understood that what has been described is merely illustrative of this invention and that numerous other arrangements in accordance with the principles of this invention may be devised by one skilled in the art without departing from the spirit and scope thereof.

What is claimed is:

1. A combination comprising a propagation medium, means responsive to each of a set of coded input signals for providing in said medium nonvolatile discontinuities having correspondingly different coded lengths, each of said discontinuities having first and second boundaries, and means external to said medium for controllably moving said discontinuities toward an output position in said medium.

2. A combination comprising a propagation medium, write means responsive to each of a set of coded input signals for providing in said medium nonvolatile discontinuities having correspondingly different coded lengths, each of said discontinuities having first and second boundaries, means external to said medium for controllably moving said discontinuity toward an output position in said medium, means responsive to the arrival of said first boundary at said output position for enabling output pulses, and means responsive to the arrival of said second boundary at said output position for inhibiting output pulses.

3. A combination in accordance with claim 2 wherein said medium is a magnetic domain wall medium and said discontinuity is a reverse domain having leading and trailing walls.

4. A combination in accordance with claim 3 wherein said write means comprises means coupled to an input position of said magnetic domain wall medium and responsive to coded two-out-of-*n* input signals for providing reverse domains of corresponding coded length in said input position.

5. A combination in accordance with claim 4 wherein said write means comprises conductive means coupled to said input position along said medium, said conductive means having a plurality of coded inputs connected to coded positions therealong and being adapted to provide reverse domains of corresponding length when those coded inputs are pulsed in coded pairs.

6. A combination in accordance with claim 4 wherein said magnetic domain wall medium is coupled by first and second means for controllably moving reverse domains through first and second portions of said medium and through said second and a third portion of said medium, respectively, said third portion including said output position.

7. A combination in accordance with claim 6 wherein said first means is responsive to each code of said coded two-out-of-*n* input signals for advancing reverse domains in said first and second portions of said medium, and means coupled to said medium responsive to the arrival of a trailing domain wall there for terminating the advance of reverse domains in said medium.

8. A combination in accordance with claim 7 wherein said second means is responsive to a digit-accept signal for advancing reverse domains from said second portion to said output position in said third portion.

9. A combination in accordance with claim 8 including interrogate means for periodically initializing an output portion of said output position.

10. A combination in accordance with claim 9 including means responsive to said interrogate pulse for indicating the reversal of flux in said output portion.

11. A combination in accordance with claim 10 including means responsive to said trailing domain wall for inhibiting digit-accept signals for a prescribed time.

References Cited

UNITED STATES PATENTS 3,387,290 6/1968 Snyder ------------ 340—174

BERNARD KONICK, Primary Examiner

G. M. HOFFMAN, Assistant Examiner

U.S. Cl. X.R.

340—347